US006749882B2

(12) United States Patent
Fortune, Jr.

(10) Patent No.: US 6,749,882 B2
(45) Date of Patent: Jun. 15, 2004

(54) COFFEE HAVING A NICOTINE COMPOSITION DISSOLVED THEREIN

(76) Inventor: Stephen Fortune, Jr., 25 Trebors Way, Bridgewater, MA (US) 02324

( * ) Notice: Subject to any disclaimer, the term of this patent is extended or adjusted under 35 U.S.C. 154(b) by 117 days.

(21) Appl. No.: 09/859,979

(22) Filed: May 17, 2001

(65) Prior Publication Data

US 2002/0009533 A1 Jan. 24, 2002

Related U.S. Application Data

(60) Provisional application No. 60/204,937, filed on May 17, 2000.

(51) Int. Cl.$^7$ .............................. A23F 5/00; A23L 2/38
(52) U.S. Cl. ....................... 426/594; 426/590; 131/276; 424/439; 424/441
(58) Field of Search ................................. 426/594, 590; 131/276; 424/439, 441

(56) References Cited

U.S. PATENT DOCUMENTS

| 3,901,248 A | | 8/1975 | Lichtneckert et al. |
| 5,721,257 A | | 2/1998 | Baker et al. |
| 5,733,574 A | | 3/1998 | Dam |
| 5,845,647 A | * | 12/1998 | O'Donnell, Jr. et al. |
| 6,053,175 A | * | 4/2000 | D'Angelo |
| 6,268,386 B1 | * | 7/2001 | Thompson |
| 6,277,429 B1 | * | 8/2001 | Zeller et al. |
| 6,280,761 B1 | * | 8/2001 | Santus |

FOREIGN PATENT DOCUMENTS

| JP | 11-215977 | * | 8/1999 |
| JP | 2000-93155 | * | 4/2000 |

* cited by examiner

*Primary Examiner*—Anthony J. Weier
(74) *Attorney, Agent, or Firm*—Wolf, Greenfield, & Sacks, P.C.

(57) ABSTRACT

The present invention relates, in part, to a nicotine-containing composition that can be readily dissolved in a beverage such as coffee. The composition includes nicotine as an active ingredient, a water-soluble filler, and in some instances, a binder. The composition can be provided as a tablet or a powder and is capable of dissolving in the beverage within a very short period of time. The present invention also relates, in part, to a method for preparing a beverage comprising nicotine. The present invention also encompasses compositions including coffee and nicotine including nicotine-coated coffee beans, or a packet containing compositions including desired amounts of coffee and nicotine.

27 Claims, No Drawings

US 6,749,882 B2

COFFEE HAVING A NICOTINE COMPOSITION DISSOLVED THEREIN

RELATED APPLICATION

This non-provisional application claims the benefit under Title 35, U.S.C. §119(e) of co-pending U.S. provisional application serial no. 60/204,937 filed May 17, 2000, incorporated herein by reference.

FIELD OF INVENTION

The present invention relates to nicotine or a nicotine-containing composition for ingestion with a beverage, such as coffee.

BACKGROUND OF THE INVENTION

In many states and countries, there exists a ban on smoking in public premises. Accordingly, a person who wishes to smoke must step outside the premises. The option of leaving the premises, however, is not present for other public places, in particular, public modes of transportation such as buses, trains or airplanes.

U.S. Pat. No. 5,733,574 discloses the use of a nicotine-containing stimulant unit for oral use, in which nicotine is released in a controlled manner. This mode of ingestion, known as "buccal" administration, may involve a substantial amount of time to ingest the desired amount of nicotine.

U.S. Pat. No. 5,845,647 discloses the use of a tobacco product comprising a propolis tobacco source in which a tobacco leaf is treated with propolis, an extract from a resin found in bee hives. The tobacco leaf can be added to a variety of beverages. This method, however, may result in insufficient extraction of nicotine from the tobacco leaf, as it is well known that commercial methods of nicotine extraction involve overly large amounts of water and/or organic solvents. In addition, if the user adds the tobacco leaf to the beverage, the user will not know how much nicotine is present in the beverage. If a nicotine-containing beverage is sold to a user, the beverage necessarily must be stored containing the nicotine. It is known, however, that nicotine is susceptible to oxidation when stored in a liquid form.

There are many brands of nicotine-containing chewing gum, such as described in U.S. Pat. No. 3,901,248 which discloses a chewable nicotine-containing composition. These products, however, can suffer from poor taste, poor gum texture, or inadequate extraction of nicotine from the gum. Additionally, there may be social situations where the act of chewing a gum is not acceptable.

Accordingly, there is a need to provide nicotine in a known amount which can be ingested in a quick and facile manner without exposing other parties to the hazards of cigarette smoke.

SUMMARY OF THE INVENTION

One aspect of the invention provides a beverage comprising a composition dissolved therein. The composition comprises nicotine and a water-soluble filler. In one embodiment, the beverage further comprises coffee.

Another aspect of the invention provides a coffee drink comprising pre-extracted nicotine.

Another aspect of the invention provides a beverage comprising a product of dissolution of a composition. The composition comprises nicotine and a water-soluble filler.

Another aspect of the invention provides a method for preparing a beverage. The method comprises the steps of providing a composition comprising nicotine and dissolving the composition in a beverage.

Another aspect of the invention provides a method for preparing coffee. The method involves providing a composition comprising nicotine and adding the composition to coffee grounds to provide a nicotine-containing mixture. The method further involves allowing hot water to pass through the mixture.

Another aspect of the invention provides an article comprising a coffee bean coated with nicotine.

Another aspect of the present invention provides a composition comprising coffee and nicotine.

DETAILED DESCRIPTION

One aspect of the present invention is directed to a composition comprising nicotine for ingestion with a beverage such as coffee. Coffee is a popular beverage and is commonly ingested at any time of the day. Certain aspects of the present invention exploit this popularity of coffee by providing a coffee drink that includes nicotine. The beneficial aspects of this beverage would be readily recognized by smokers, who may be forced to refrain from smoking in a public place. The smoker would not have to leave a social gathering, or cease working by leaving the premises to smoke. Another advantage is that the composition presents a known amount of nicotine to the user, which is an important feature especially if the user is under strict dietary control or is involved in smoking cessation therapy. In addition, by providing the nicotine in a beverage, such as coffee, there is little waste of nicotine and a user can ingest the nicotine in a quick and relatively discrete manner, as opposed to sucking a lozenge or chewing a gum.

One aspect of the present invention features a beverage, such as coffee, which contains nicotine. In particular, this aspect provides a beverage comprising a composition dissolved therein, where the composition comprises nicotine. The beverage typically comprises water, although alcohols or other edible fluids may also be present. Other example beverages include iced coffee, hot or iced tea, hot cocoa, soft drinks or any other beverage known to those of ordinary skill in the art. In one embodiment, the composition contains pre-extracted nicotine, i.e. extracted and isolated nicotine. "Pre-extracted nicotine" refers to commercially available nicotine, or nicotine extracted and isolated by known methods, as opposed to adding a tobacco product to the coffee drink in which the coffee drink itself extracts the nicotine from the tobacco. Thus, pre-extracted nicotine is to be distinguished from adding tobacco directly to the beverage which can result in the addition of other undesired products to the beverage. By using pre-extracted nicotine in the composition, this aspect of the present invention provides the advantageous feature of providing a predetermined amount of nicotine.

Nicotine can be extracted from tobacco as a tobacco alkaloid. "Nicotine" refers to a substance which is provided in many forms, such as in free base form or as a nicotine salt. A nicotine salt refers to any pharmaceutically acceptable acid salt or metal salt. Pre-extracted nicotine is commercially available from a number of companies, such as Sigma-Aldrich Corp. (St. Louis, Mo.). Examples of commercially available forms of nicotine include neat nicotine, 98% or 99% nicotine (yellow liquid), nicotine-di-p-toluoyltartrate salt (white to off-white powder), nicotine free base (yellow liquid), nicotine hemisulfate salt (brown liquid, 40% aqueous solution w/v) and nicotine hydrogen tartrate salt. Other nicotine salts include the hydrochloride, dihodrychloride, sulfate, zinc chloride double salt monohydrate, and salicylate salts. Alternatively, nicotine can be extracted and isolated by a number of published methods, such as described in the Merck Index, Eleventh Edition.

In one embodiment, the composition contains nicotine in an amount from about 0.01% to about 10% by weight of the composition. A typical cigarette provides anywhere from approximately 1 mg to 4 mg of nicotine. In one embodiment, the composition can contain from about 0.1 mg to about 20 mg nicotine, although it is understood that the composition can comprise any desired amount of nicotine. Other exemplary amounts include from about 0.5 mg to about 15 mg, from about 0.5 mg to about 10 mg, or from about 0.5 mg to about 5 mg of nicotine.

In one embodiment, the composition further comprises a filler. Preferably, the filler is inert and water-soluble. In one embodiment, the filler has sufficient water solubility properties such that the composition dissolves in a beverage, or a hot beverage within less than a few minutes, preferably within less than about 1 minute, and even more preferably within less than about 30 seconds. Dissolution can be aided by stirring and/or heating the beverage. It is understood by those of ordinary skill in the art that the solubility of the composition can depend on other factors such as temperature of the beverage or other components present in the beverage prior to addition of the composition. With hot coffee, for example, dissolution would be expected to occur rapidly due to the high temperature.

There are numerous possibilities of water-soluble fillers to choose from, and example fillers include sugars such as sucrose, fructose, dextrose, lactose, sorbitol or mannitol. Other fillers include naturally-occurring and synthetic water-soluble polymers. Examples of water-soluble polymers include carbohydrates such as starch and starch derivatives, and cellulose products such as methyl cellulose and carboxymethyl cellulose. Synthetic water-soluble polymers include polyvinyl alcohol and polyvinylpyrrolidone. Combinations of any number of these fillers can also be provided. Other fillers are known to those of ordinary skill in the art, such as described in U.S. Pat. No. 5,721,257, columns 15-21, which is incorporated herein by reference. In addition, the filler and thus the composition can also provide a sweetener, and the amount of filler present may be tailored to provide a desired amount of sweetener. Example sweeteners include those already described herein in addition to those described in U.S. Pat. No. 5,721,257, columns 15-18, which is incorporated herein by reference.

In one embodiment, the filler is present in an amount from about 50% to about 99.9% of the total composition by weight. It is understood by those of ordinary skill in the art that the amount of filler is dependent on the amount of other ingredients present, and the filler can be present in the composition in other ranges, such as from about 50% to about 95%, from about 50 to about 90%, from about 50 to about 80%, or from about 50 to about 75% by weight of the total composition.

In one embodiment, the composition is a powder. The powdered composition can be sold to the consumer as a sachet or in a packet. The sachet itself can be water-soluble. The powdered composition can be contained in a gel capsule. Alternatively, the composition can be sold in bulk, and a user can add in a desired amount of the composition into the beverage. Ideally, the filler also has properties such that the composition retains its integrity throughout conditions of packaging, storing and handling.

In one embodiment, the composition is a tablet. The tablet can be formed by various compression methods, such as cold compression. The tablet can be a disk, a wafer, a sphere, any ovate shape or any other shape. Typical dimensions of the tablet can range from 2 mm to about 10 mm. Where the tablet has an irregular shape such as an oval shape, the tablet can have one dimension from 5–10 mm and a smaller dimension from about 2 mm to about 7 mm. Where the tablet has a disk or a disk-like shape, the tablet can have a thickness from about 2 mm to about 5 mm.

The tablet can have any desired weight that allows for easy packaging, storage or handling. Typically, tablets have a weight from about 10 mg to about 1000 mg, although larger tablets or smaller tablets can be prepared. Other example weight ranges of the tablet includes a weight of from about 50 mg to about 500 mg, from about 50 mg to about 250 mg, from about 50 mg to about 150 mg, or from about 50 mg to about 100 mg.

For certain fillers, and depending on the type of nicotine used or other ingredients present in the composition, the filler by itself may have sufficient adhesive properties for tablet formation. In certain other embodiments, the composition may further comprise a binder to maintain tablet integrity. In one embodiment, the binder is present in the composition in an amount from about 1% to about 20% by weight of the total composition. Other ranges include from about 1% to about 10%, or from about 1% to about 5% by weight of the total composition. Examples of binders are numerous and include acacia and gelatin. Other examples of binders can also include any of the fillers listed above that provide sufficient binding capabilities. The binder should also have sufficient water-solubility properties to allow the composition to dissolve within time periods mentioned previously.

The composition can further include lubricants, coloring, and flavoring agents, as described in U.S. Pat. No. 5,721,257, columns 15–21, which is incorporated herein by reference.

Another aspect of the invention provides a coffee drink comprising pre-extracted nicotine. Unlike the addition of nicotine through tobacco, this aspect of the invention provides the advantageous features of a beverage, such as a coffee drink, having a predetermined amount of nicotine.

Another aspect of the invention provides a method for preparing a beverage, such as coffee. The method comprises the steps of providing a composition comprising nicotine and dissolving the composition in a beverage. In one embodiment, the composition comprises any of the nicotine compositions described herein. In another embodiment, the composition can consist essentially of nicotine. The composition can comprise any combination of components described previously. The step of dissolving can be aided with stirring and/or heating, depending on the type of beverage.

Another aspect of the invention provides a method for preparing coffee. The method involves providing a composition comprising nicotine and adding the composition to coffee grounds to provide a nicotine-containing mixture. Typically, this mixture would be placed in a coffee filter or other like article. The method further involves allowing hot water to pass through the mixture. This step can involve percolation and/or coffee filtration. Alternatively, espresso drinks can be provided with any espresso machine. Preferably, the composition is provided as a powder, and more preferably a water-soluble powder, to ensure rapid dissolution while brewing. It is understood by those of ordinary skill in the art that the composition can also be provided as rapidly dissolving pellets, or tablets, or any other shape known to those of ordinary skill in the art. In one embodiment, the composition comprises any of the nicotine compositions described herein. In another embodiment, the composition can consist essentially of nicotine.

Another aspect of the invention provides an article comprising a coffee bean coated with nicotine. Preferably, the beans are ground prior to brewing to prevent stratification of the mixture. For example, if the coffee grounds and the solid nicotine are stored for long periods of time, the denser particles will tend to accumulate at the bottom of the mixture, resulting in loss of homogeneity. Loss of homogeneity further results in inconsistent amounts of nicotine present throughout the ground coffee mixture. Thus, grinding nicotine-coated coffee beans immediately prior to brewing ensures the homogeneity of the coffee/nicotine mixture and thus the nicotine:coffee ratio can be maintained at a known and constant level. The nicotine:coffee ratio can be selected by simply choosing the desired amounts. Typically, the nicotine is provided as a water-based or alcohol-based solution, or a water-alcohol mixture, the ratios being easily selected by those of ordinary skill in the art. The coffee bean can be coated by any method known to those of ordinary skill in the art, including methods such as spray-coating the coffee bean with the solution, or dipping the coffee bean into the solution. Upon allowing the water and/or alcohol solvent to evaporate, a thin film of nicotine coats the coffee beans. The coating can comprise a thick liquid or a powder, depending on the initial composition of the nicotine, e.g. as a liquid or as a salt.

Alternatively, stratification can be avoided by providing nicotine as a powder, e.g. a nicotine salt, and ensuring that the coffee and nicotine particles have approximately the same particle size and approximately the same density. In another embodiment, the nicotine particles can be provided as a nicotine composition comprising a filler or any other component, as described herein.

Another aspect of the present invention provides a composition comprising coffee and nicotine. The composition can be a liquid or a solid. In on embodiment, the composition can comprise a mixture of coffee and nicotine. The coffee can be a solid or dissolved in a liquid and provided as coffee beans, coffee grounds (from coffee beans), or crystals of instant coffee. The nicotine can be provided as described herein. In one embodiment, the composition can be provided in a packet. This ensures that the desired amounts of coffee and nicotine are known and controlled. The packet can include crystals of instant coffee and nicotine, or ground coffee and nicotine in which the contents are poured into a coffee filter and brewed. Respective amounts of nicotine and coffee can be varied as desired, as well as the packet serving. Other components can be included in the composition, such as sweeteners or fillers or other components as described herein. In another embodiment, the composition consists essentially of coffee and nicotine.

The foregoing has been a detailed description of preferred embodiments. Various modifications and equivalents can be made without departing from the spirit and scope of this invention. This description is, therefore, meant to be taken only by way of example and not to otherwise limit the scope of the invention. The function and advantage of these and other embodiments of the present invention will be more fully understood from the examples below. The following examples are intended to illustrate the benefits of the present invention, but do not exemplify the full scope of the invention.

EXAMPLE 1

Ground Coffee-Containing Nicotine 8.5 g of coffee beans are spray-coated with or dipped into a solution containing 2 mg of nicotine. The solvent is allowed to evaporate, resulting in a dry nicotine coating around the coffee beans. Preferably, the beans are ground prior to brewing for optimal homogeneity and to prevent stratification of ingredients. 8.5 g of coffee beans is typically a sufficient amount to brew a 6 oz. cup of coffee. It is understood that the amount of coffee to nicotine can be varied as desired.

EXAMPLE 2

Preparation of Instant Coffee Packets Containing Nicotine 3.5 g of instant coffee crystals and 2 mg of nicotine are added to a single-serving coffee packet and sealed. This is typically a sufficient amount to prepare a 6 oz. cup of coffee. It is understood that the amount of coffee to nicotine can be varied as desired, and that the amount of the coffee-nicotine mixture in the packet can be increased or decreased as desired.

What is claimed:

1. A water soluble composition formulated to be suitable for use in forming a nicotine-containing beverage comprising water, and having sufficient water solubility such that a quantity of the composition sufficient to form the nicotine-containing beverage is able to dissolve to form the nicotine-containing beverage in less than about one minute, composition comprising:

pre-extracted nicotine; and a water-soluble filler.

2. The composition of claim 1, wherein the composition comprises nicotine in a pre-determined amount.

3. The composition of claim 1, wherein the composition comprises nicotine in an amount from about 0.1% to about 10% by weight.

4. The composition of claim 1, wherein the composition comprises nicotine in an amount from about 0.1 mg to about 20 mg.

5. The composition of claim 1, wherein the filler is present in an amount from about 1% to about 99.9% by weight.

6. The composition of claim 5, wherein the filler is selected from the group consisting of a sugar, a water-soluble polymer and mixtures thereof.

7. The composition of claim 6, wherein the sugar is selected from the group consisting of sucrose, fructose, dextrose, lactose, sorbitol, mannitol and mixtures thereof.

8. The composition of claim 6, wherein the polymer is selected from the group consisting of a carbohydrate and a synthetic polymer.

9. The composition of claim 8, wherein the carbohydrate is selected from the group consisting of a starch and a cellulose product.

10. The composition of claim 1, wherein the composition further comprises a binder.

11. The composition of claim 10, wherein the composition comprises a binder in an amount from about 1% to about 20% be weight.

12. The composition of claim 10, wherein the composition comprises a binder selected from the group consisting of acacia and a gelatin.

13. The composition of claim 1, wherein the composition further comprises a material selected from the group consisting of lubricants, coloring agents, and flavoring agents.

14. The composition of claim 1, wherein the composition further comprises coffee.

15. The composition of claim 1, wherein the composition is water-soluble.

16. The composition of claim 15, wherein the composition is formulated so that it dissolves in a given quantity of water within less than about 1 minute.

17. The composition of claim 15, wherein the composition is formulated so that it dissolves in a given quantity of water within less than about 30 seconds.

18. The composition of claim 15, wherein the composition is a powder.

19. The composition of claim 15, wherein the composition is a tablet.

20. A water-soluble packet containing therein a quantity of the composition of claim 18.

21. A gel capsule containing therein a quantity of the composition of claim 18.

22. An article comprising a coffee bean coated with nicotine.

23. A composition, comprising coffee and pre-extracted nicotine, wherein the coffee is in solid form.

24. The composition of claim 23, wherein the coffee comprises ground coffee beans.

25. The composition of claim 23, wherein the coffee comprises crystals of instant coffee.

26. The composition of claim 23, wherein the nicotine comprises a liquid.

27. The composition of claim 23, wherein the nicotine comprises a salt.

* * * * *